July 2, 1957 — O. JENSEN — 2,797,989
PROCESS FOR THE PRODUCTION OF SPONGE
IRON WITH GAS AS REDUCING AGENT
Filed Jan. 31, 1955
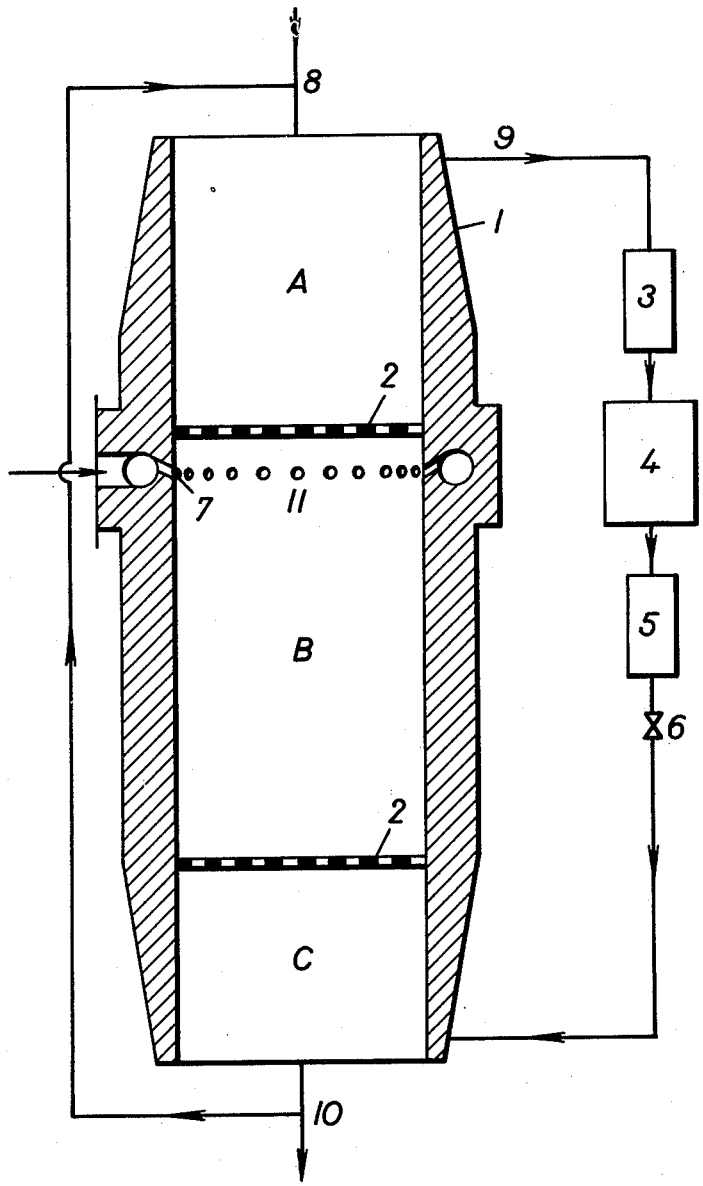
INVENTOR
OLAF JENSEN
BY
Wenderoth, Lind & Ponack
Attys.

United States Patent Office 2,797,989
Patented July 2, 1957

2,797,989

PROCESS FOR THE PRODUCTION OF SPONGE IRON WITH GAS AS REDUCING AGENT

Olaf Jensen, Oslo, Norway, assignor to Norsk Hydro-Elektrisk Kvaelstofaktieselskab, Oslo, Norway Application January 31, 1955, Serial No. 485,191

Claims priority, application Norway February 2, 1954

6 Claims. (Cl. 75—35)

Iron ore can, as is known, be dry-reduced with the aid of gas at a temperature of approximately 900–1000° C. As reducing gas carbon oxide and hydrogen come technically first into consideration. Other carbonic and hydrogenous gases should first be decomposed to carbon oxide and hydrogen before being used for the reduction of iron ore.

Reduction of iron oxides with carbon oxide is a slightly exothermic reaction, while reduction with hydrogen is endothermic and therefore requires the addition of energy. With gas mixtures consisting of carbon oxide and hydrogen the reduction process will be endothermic if the gas contains more than 25–30% $H_2$ by volume, and the furnace has to be supplied with energy from an outside source in order to maintain the correct temperature in it.

The method is known of reducing iron ore by means of gas consisting mainly of hydrogen and carbon oxide in a vertical shaft furnace with electric resistance heating. It is known, further that this process offers many advantages when the reducing gas contains at least 50% hydrogen, calculated on the content of hydrogen and carbon oxide in the gas. Thus experience has shown that when the gas contains at least 50% hydrogen, the separation out of the carbon by cooling of the sponge iron in such a gas is very small. Moreover, such a high content of hydrogen will in a substantial degree increase the reaction velocity, so that the reducing process will proceed more rapidly than when a reducing gas containing mainly carbon oxide is used.

Many methods have been suggested of solving the problems connected with attempts to reduce iron ore by means of gas consisting mainly of hydrogen and carbon oxide. One of the difficulties is that the reduction temperature has to be kept within relatively narrow limits, that is to say, sufficiently high for the reduction to have a satisfactory course, but at the same time sufficiently low for the avoidance of welding or fusing of the pieces of iron ore.

In spite of all the proposals no one has hitherto succeeded in finding a process which in a perfectly satisfactory manner, both technically and economically, solves the difficulties attached to the reduction of iron ore by means of a gas containing mainly hydrogen and carbon oxide which contains more than 25–30% hydrogen.

The invention relates to a process for the reduction of iron ore (piece ore or agglomerated iron ore concentrate) by means of gas consisting mainly of hydrogen and carbon oxide as reducing agent in a vertical shaft furnace with upward flow of gas and with electric resistance heating. The object of the invention is to overcome the difficulties which experience has shown to attach to such reduction process. By carrying out the process conformably with the invention even and easily controllable temperature conditions are obtained in the furnace, and the local overheatings which cause fusing and/or welding together of the pieces of iron ore are avoided. Further, a practically complete heat regeneration is obtained according to the invention, which has great importance for the technical realization of the process and for the cost of this, as the quantity of heat which has to be exchanged in the upper and lower part of the furnace will be considerable and of the order of size 1000 kwh. per ton reduced iron. Other advantages and purposes of the invention will emerge from the following description.

The invention is based on the method that the gas which is withdrawn from the top of the furnace in cooled state, and after being freed from its content of aqueous vapour and carbonic acid, is led back to the bottom of the furnace, while at the same time heated fresh gas is conducted into the furnace with such content of hydrogen and carbon oxide that the circulatory gas led into the bottom of the furnace contains at least 50% hydrogen calculated on its content of hydrogen and carbon oxide.

The characteristic feature of the invention is that a substantial part of the complete reduced sponge iron taken from the bottom of the furnace in cooled state is put into the top of the furnace together with unreduced iron ore, and that the fresh gas is fed into the main reaction zone of the furnace in the upper part of this.

We have found, further, that it is an advantage if the quantity of completely reduced sponge iron put back into the furnace represents about half the quantity of totally produced sponge iron. We have found, too, that the fresh gas ought to be passed into the furnace at a temperature of 800–1000° C., preferably about 900° C.

There is a possibility, however, that in the course of the reconduction of the reduced sponge iron to the top of the furnace the sponge in the upper part of the furnace may be reoxidized to ferrous oxide (FeO) by the upward flowing gas. In order to avoid such oxidation the degree of interaction of the gas ought not to exceed 40%, which object is attained by regulating the quantity of circulatory gas in such manner that the gas which is passed out from the top of the furnace has a content of aqueous vapour and carbonic acid of maximum 40%, preferably 30–35% ($H_2O + CO_2$) by volume, calculated in relation to its content of $H_2O$ (as vapour), $CO_2$, $H_2$ and $CO$.

According to the invention the furnace is heated by electric resistance heating with one-phase alternating current or direct current and with the formed sponge iron as resistance material, and the electric energy is supplied through an upper and a lower electrode, while at the same time the fresh gas is passed into the furnace through an annular channel just below the upper electrode.

If the process is carried out in accordance with the invention the difficulties which invariably are met with in processes of this kind will be avoided.

Inasmuch as the fresh gas is introduced into the furnace immediately below the upper electrode, the local overheatings which otherwise occur on or in the vicinity of this electrode will not arise, the velocity of the gas being greatest at this point. Moreover, by introducing the fresh gas at this point the substantial advantage is gained that the degree of interaction of the gas mixture at the moment it leaves the main reduction zone (situated between the upper and the lower electrode) is considerably lower than 30%, so that the electric heat development in the main reduction zone not only serves to cover the heat consumption of the reaction in this, but also to heat the gas still further before it leaves the zone. As, moreover, the fresh gas is introduced into the upper part of the main reduction zone at a temperature of approximately 900° C., a production of metallic iron is also obtained in the prereduction zone (situated over the upper electrode), especially on the surface of the ore. The maximum temperature in the furnace is obtained level with the top electrode.

In the electric resistance heating of the furnace it is an advantage that the iron ore introduced is mixed with completely reduced sponge iron, the difference in electric conductively which occurs in the course of the reduction being thereby brought to a minimum. Further, the said production of metallic iron in the prereduction zone, especially on the surface of the pieces of metal, has the effect that the electric conductivity of the resistance material can be still further increased before the ore reaches the zone of electric current between the electrodes. By placing an electrode at each end of the main reduction zone the advantage is also obtained that the heat development, which is inversely proportional to the electric conductivity of the material, will be greatest in the upper part of this zone, where the reduction proceeds most rapidly and with maximum consumption of heat.

If the process is effected in the manner described above, the direct heat requirements of the furnace will be confined to covering the negative reaction heat and to the unavoidable loss by heat exchange and loss through the furnace walls. The negative reaction heat which is required for reduction of magnetite ($Fe_3O_4$) with a gas mixture consisting of 1 part $H_2$+1 part CO is theoretically only about 105 kwh. per ton reduced iron. The heat-exchanging masses are in direct contact with one another, and the temperature difference between these masses will therefore be small in this extremely hydrogenous reducing gas, and the heat loss by heat exchange will consequently also be small. The outgoing gas ought, however, to have a temperature which is higher than the dewpoint of the gas.

The walls of the furnace can be well insulated, so as to reduce to a low point the loss of heat through these.

In order to make the process clearer I shall in the following describe it with reference to the enclosed outline drawing of a furnace suitable for carrying out the process.

In the drawing 1 denotes a shaft furnace having, for example, a cylindrical cross section. The furnace consists of a gasproof iron mantle lined on the inside with fireproof brick and with a layer of insulating brick next to the iron mantle. A is the preheating or prereducing zone of the furnace, bounded below by the upper electrode. In this zone the iron ore will be preheated and partially reduced (prereduced) by the upward flowing hot gas. In the main reduction zone B, situated between the upper and the lower electrode, the ore will be reduced completely to sponge iron at a temperature between 800 and 900° C. Zone C, situated below the lower electrode, is the cooling zone, where the sponge iron is cooled to ordinary temperature by the incoming cold circulatory gas.

2 denotes electrodes, for example, made of iron, which may be supplied with one-phase alternating current or direct current.

The electrodes may be of any, per se, known shape, for example, have the form of open grids through which the iron ore can pass and which on the inside are cooled by water, oil or gas.

3 is a gas cooler, where also the reaction water formed is condensed.

4 is a compressor for compressing the circulatory gas to 20–25 atm.

5 is a pressure washer for washing away the carbonic acid content of the gas with water.

6 is a reducing valve.

7 is an annular channel for introduction of the hot reducing gas into the furnace.

At 8 a mixture of iron ore and recirculated sponge iron is introduced.

*Example*

In a furnace such as is illustrated in the drawing 1630 kg. iron ore ($Fe_3O_4$) containing 64.5% Fe was introduced per hour at 20° C. This ore was at 8 mixed with 1110 kg. reduced and cooled sponge iron. At 7 530 $Nm.^3$ reducing gas containing 280 $Nm.^3$ Co and 250 $Nm.^3$ $H_2$ was added per hour at a temperature of 900° C.

From the top of the furnace, at 9, a gas mixture containing 280 $Nm.^3$ $CO_2$, 600 $Nm.^3$ Co, 600 $Nm.^3$ $H_2$ and 202 kg. $H_2O$ (vapour) is withdrawn at 150° C. per hour. In the cooler 3 202 kg. $H_2O$ is condensed and removed per hour. The remaining gas mixture is compressed in the compressor 4 (energy requirement 250 kwh.) to a pressure of 25 atm., and in the pressure washer 5 the gas mixture's content of $CO_2$ is washed out and removed. After passing the reduction valve 6 the remaining gas mixture, consisting of 600 $Nm.^3$ CO and 600 $Nm.^3$ $H_2$, is conducted into the bottom of the furnace at 20° C.

From the bottom of the furnace, at 10, 1250 kg. sponge iron containing 1000 kg. metallic Fe is tapped off per hour, while 1110 kg. sponge iron is conducted back to the top of the furnace and mixed with the iron ore.

The temperature of the lower electrode is 700–800° C., while the temperature at the upper electrode is approximately 900° C. The electrodes are supplied with an energy equivalent to 150 kw. per hour.

During the reduction process in the furnace the composition of the gas is altered, with the result that at 11, in the upper end of the main reduction zone, but before being mixed with the fresh gas, it has the following composition calculated per hour:

150 $Nm.^3$ $CO_2$, 450 $Nm.^3$ CO, 420 $Nm.^3$ $H_2$ and 146 kg. $H_2O$ vapour.

The above data relates to a furnace having the following dimensions:

Total height approximately 11 m., whereof zone A approximately 3 m., zone B approximately 6 m. and zone C approximately 2 m. Inside diameter of furnace approximately 1.25 m.

In this example it is, for the sake of simplicity, postulated that the gas is pure, and free from the usual technical impurities such as carbonic acid, methane and nitrogen, and further that aqueous vapour and carbonic acid are removed quantitatively from the circulatory gas, which will of course not be the case in the practical execution of the process. This involves however, in practice no corrections of significance, and does not affect the character of the method.

As will be seen, the amount of electric energy supplied to the reduction furnace is surprisingly little—only 150 kwh. per 1250 kg. produced sponge iron. By the method according to the invention the main part of the total energy requirements, that is, for producing the reducing gas and compressing the circulatory gas, will be consumed by apparatuses and processes outside the production furnace itself, where only familiar apparatuses and processes are concerned.

I claim:

1. Process for reduction of iron ore with gas consisting mainly of hydrogen and carbon oxide as reducing agent in a vertical shaft furnace by electric resistance heating with upward directed flow of gas, in which the gas is withdrawn from the top of the furnace in cooled state and after being freed from its content of aqueous vapour and carbonic acid is conducted back to the bottom of the furnace, while at the same time heated fresh gas is passed into the furnace, having such content of hydrogen and carbon oxide that the circulatory gas which is introduced into the bottom of the furnace contains at least 50° hydrogen calculated on the content of hydrogen and carbon oxide in the gas, comprising the improvement that a substantial part of the completely reduced sponge iron, which is extracted from the bottom of the furnace, is re-introduced in cooled state into the top of the furnace together with unreduced iron ore, and that the fresh gas is passed into the main reaction zone of the furnace between lower and upper electrodes situated in the upper part of the latter.

2. Process as specified in claim 1, wherein the amount of completely reduced sponge iron conducted back into the furnace represents about half the amount of the totally produced sponge iron.

3. Process according to claim 1, wherein the fresh gas is supplied to the furnace at a temperature of 800–1000° C.

4. Process according to claim 3, wherein said last-mentioned temperature is about 900° C.

5. Process for reduction of iron ore with gas consisting mainly of hydrogen and carbon oxide as reducing agent in a vertical shaft furnace by electric resistance heating with upward directed flow of gas, in which the gas is withdrawn from the top of the furnace in cooled state and after being freed from its content of aqueous vapour and carbonic acid is conducted back to the bottom of the furnace, while at the same time heated fresh gas is passed into the furnace, having such content of hydrogen and carbon oxide that the circulatory gas which is introduced into the bottom of the furnace contains at least 50% hydrogen calculated on the content of hydrogen and carbon oxide in the gas, comprising the improvement that a substantial part of the completely reduced sponge iron, which is extracted from the bottom of the furnace, is re-introduced in cooled state into the top of the furnace together with unreduced iron ore, and that the fresh gas is passed into the main reaction zone of the furnace between lower and upper electrodes situated in the upper part of the latter, the amount of completely reduced sponge iron conducted back into the furnace representing about half the amount of the totally produced sponge iron, and the fresh gas supplied to the furnace being at a temperature of 800–1000° C.

6. Process according to claim 5, wherein said last-mentioned temperature is about 900° C.

References Cited in the file of this patent

UNITED STATES PATENTS

| 957,337 | Hixon | May 10, 1910 |
| 1,129,512 | Peacock | Feb. 23, 1915 |
| 1,256,623 | Westberg et al. | Feb. 19, 1918 |
| 1,548,279 | Pike | Aug. 4, 1925 |
| 2,080,028 | Avery | May 11, 1937 |
| 2,142,100 | Avery | Jan. 3, 1939 |
| 2,528,553 | Royster | Nov. 7, 1950 |
| 2,569,215 | Altenburger | Sept. 25, 1951 |

FOREIGN PATENTS

| 364,699 | Great Britain | Jan. 14, 1932 |